United States Patent [19]

Gurewitz

[11] Patent Number: 5,364,695
[45] Date of Patent: Nov. 15, 1994

[54] THERMOPLASTIC FILM FROM POLYETHYLENE HAVING IMPROVED SURFACE ADHESION AND METHOD OF MAKING THEREOF

[76] Inventor: Richard M. Gurewitz, 5914 Woodland View Dr., Woodland Hills, Calif. 91367

[21] Appl. No.: 546,717

[22] Filed: Jul. 2, 1990

[51] Int. Cl.$^5$ ................................. B32B 5/16
[52] U.S. Cl. ............... 428/323; 156/244.11; 156/244.12; 156/244.22; 156/309.6; 156/309.9; 264/171; 428/332; 428/517; 428/519; 428/521
[58] Field of Search ............... 428/218, 210, 323, 332, 428/329, 537.5, 517, 519, 521; 264/176.1, 209.1, 211.12, 171; 156/244.11, 244.12, 244.22, 309.6, 309.9

[56] References Cited

U.S. PATENT DOCUMENTS 4,082,880  4/1978  Zboril ................................ 428/220
4,663,216  5/1987  Toyoda et al. ..................... 428/323
4,999,335  3/1991  Mruk et al. ......................... 428/195

Primary Examiner—Paul J. Thibodeau
Assistant Examiner—H. Thi Lê
Attorney, Agent, or Firm—Harlan P. Huebner

[57] ABSTRACT

A trilayer thermoplastic film and method of making the same composed of an outer layer, a core layer, and an inner layer. The outer layer is made essentially from a mixture of high density polyethylenes, inorganic lamellar filler, and polycaprolactone. The incorporation of polycaprolactone into the outer layer gives the invention its primary advantage since the polycaprolactone gives the outer surface of the envelope the ability to bond with standard adhesives found in the gum on the back of postage stamps and address labels. The core layer is composed essentially of low density polyethylenes and inorganic lamellar filler. The inner layer is composed essentially of high density polyethylenes and inorganic lamellar filler.

25 Claims, No Drawings

THERMOPLASTIC FILM FROM POLYETHYLENE HAVING IMPROVED SURFACE ADHESION AND METHOD OF MAKING THEREOF

BACKGROUND OF THE INVENTION

1. Field of the Invention

The present invention relates to the production of paper-like thermoplastic films and more particularly to the production of such paper-like films from polyethylene containing inorganic fillers by extruding the film as a tube using a mandrel or using gas pressure within the tube.

2. Background of the Invention

For many years, the plastics industry has been trying to invent a synthetic paper of plastic that could be used to make light weight envelopes. Up until now these efforts have failed because no one was able to formulate a plastic with paper-like properties that would allow a postage stamp to adhere to its surface. The present invention overcomes this stubborn problem through the ingenuous addition of caprolactone to the film. The new film is approximately half the weight of the paper manila envelopes that it replaces, thus reducing the cost of postage. The envelopes made out of the invention are also stronger than paper envelopes thereby allowing the envelopes made out of the invention to be reused. Since the envelopes are recycleable, the consumer can save on the purchase of new envelopes. In addition, wide spread use of such envelopes could help reduce the volume of paper deposited in our nation's overburdened landfills.

SUMMARY OF THE INVENTION

It is the purpose of the present invention to provide a plastic formulation from which sheets of plastic can be made for forming envelopes. The improvement comprises the incorporation of polycaprolactone into the plastic formulation to give the surface of the plastic the ability to bond with the glue on the back of stamps, mailing labels, or other glue backed members.

It is another purpose of the present invention to provide a trilayer envelope, with the outer layer having polycaprolactone contained therein, that will be durable enough to be reused.

Another object of the present invention is to provide methods for making the polycaprolactone envelopes.

These and other objects and advantages of the present invention will become apparent from the following detailed description of the preferred embodiment of the invention without intending to limit the scope of the invention which is set forth in the appended claims.

DETAILED DESCRIPTION OF THE PREFERRED EMBODIMENT

U.S. Pat. No. 4,082,880 ('880) is hereby incorporated by reference. One may prepare the present invention by incorporating caprolactone into the thermoplastic layer described in the '880 patent in quantities of from 1 to 30% by weight. In the preferred embodiment, caprolactone is incorporated into the thermoplastic layer in the amount of approximately 3% by weight.

In another of the preferred embodiments, the envelope is composed of three layers: An outer layer, a core layer, and an inner layer. These three layers are continuously extruded through a circular tubular die. The circular tubular die has three circular tubular spaces within it. There is an outer circular tubular space for the passage of the materials that will form the outer layer (hereinafter called the outer die space). There is a core circular tubular space for the passage of the materials that will form the core layer (hereinafter called the core die space). And there is a inner circular tubular space for the passage of the materials that will form the inner layer (hereinafter called the inner die space). The outer die space has the greatest radius in relation to the core and inner die spaces. The inner die space has the smallest radius in relation to the outer and core die space. The core die space has a radius between that of the inner and outer die spaces. In this way, the three die spaces are aligned in the same relationship as the outer, core, and inner layers are in the finished product. The barriers between the outer, core, and inner die spaces keep the three layers from mixing while they pass through the die. The die has one end for receiving raw material into the outer space, the core space, and the inner space. The raw materials for each layer are placed in separate extruders. Each extruder for each layer heats up the raw materials so that they become liquified. The extruders then mix the ingredients by stirring them. The liquid mixtures in each extruder for each layer are then pumped into their respective die spaces: The extruder containing the ingredients for the outer layer is connected to the outer die space. The extruder containing the ingredients for the core layer is connected to the core die space. And the extruder containing the ingredients for the inner layer is connected to the inner die space. The ingredients in each extruder are pumped into the respective die spaces. The die is kept at a temperature above the melting point of each layer so that each layer can be pumped through the die.

The die also has an end from which the ingredients exit the die. The die itself is constructed so that the inner die space tapers toward the core die space until it meets the core die space. The outer die space also tapers toward the core die space until it meets the core die space. In this way, the three layers enter the same die space, called the common die space, in the order in which the layers are desired in the final product. The viscosity of the layers prevent them from completely mixing together in the common die space. However, there is some surface mixing between the layers in the common die space, but this is desired to assist in the fusion of the layers together.

At the top of the die (i.e., at the exit end of the die), there is a long blowing tube in axial alignment with the die. The three layers enter the blowing tube as they exit the con, non die space. The radius of the blowing tube is greater than the radius of the common die space. As the tubular layers travel up the blowing tube, they cool and begin to solidify. By the time the tubular trilayer reaches the top of the blowing tube, the layers have fused together. In this way, the outer layer forms the outer surface of the tube, the inner layer forms the inner surface of the tube, and the core layer becomes sandwiched between the inner and outer layers. When the three layers are formed together, the preferred thickness is 90 microns, but may range from 60 microns to 250 microns. The use of three layers adds strength to the envelope so that it will resist tearing while in use. Also the added strength permits it to be reused. If only one layer is used instead of three, then the thickness ranges from 20 microns to 250 microns.

At the top of the blowing tube are rollers through which the fused layers pass. The rollers serve to pull the tubular trilayer up the tube and also serve to collapse the tubular trilayer into a sheet. In this way, the tubular trilayer can be collapsed flat so that it can be wound up forming a roll of the material.

Through the center of the die is a narrow tube through which air is pumped. Since the tubular trilayer is pinched off at the top of the blowing tube by the rollers, there is no place for the air to escape. Therefore, the air pressure builds up in the interior space of the tubular trilayer. Thus, the air forces the trilayer layer to expand. The amount of air blown into the interior space of the tubular trilayer determines the diameter of the finished bag. When the air pressure is increased, the tubular trilayer is forced to expand, thereby increasing the diameter of the tubular trilayer. When a smaller tubular trilayer is desired, less air is pumped into the interior space of the tubular trilayer. The thickness of the tubular trilayer is regulated by the speed of the rollers at the top of the blowing tube. Increasing the speed of the rollers will stretch the trilayer out causing the formation of a thinner finished product. Decreasing the speed of the rollers causes the formation of a thicker finished product.

Once the inner, outer, and core layers are thermally bonded together and have exited the rollers, the resulting trilayer is bombarded with electrons in a prior art process known in the art as "corona treatment". In the preferred embodiment, the corona treatment level is set at 35 to 72 dynes. The corona treatment activates the caprolactone so that stamps and the like will adhere to the surface of the envelope. The corona treatment also creates sufficient surface tension to permit printer's ink to adhere to the surface without smearing. If the corona treatment is not employed, then the effectiveness of the caprolactone will be greatly reduced and one will encounter great difficulty in using the outer layer for a printing surface.

The preferred embodiment of the outer layer of the envelope is composed of 70–99% by weight of a high density polyethylene having a maximum melt flow of up to 2 decigrams per minute and a density in the range of 0.940 to 0.970 grams per cubic centimeter. Mixed with the high density polyethylene are any inorganic lamellar filler particles of the kinds described in the the '880 patent in proportions of 1–29% by weight of inorganic lamellar filler particles, the largest dimension of said particles being less than 150 microns and said particles having a minimum particle diameter to particle thickness ratio of about 5:1. To this mixture, one must add polycaprolactone in proportions of 1–29% by weight. In the preferred embodiment, the outer layer composes essentially 10–33% of the thickness of the completed trilayer.

The above ingredients that form the outer layer are commercially supplied in dry crystalline and beaded form. They should be thoroughly mixed in such dry form to insure that the caprolactone is distributed evenly throughout the outer layer due to the respective heterogenous character of the ingredients. Mixing the caprolactone in after the polyethylene and lamellar filler have been liquified is not as effective because the viscosity of the liquified polyethylene hinders even distribution of the caprolactone and because polycaprolactone does not mix well with polyethylenes. Furthermore, the mixing of caprolactone into the polymer after it had been liquified creates unsightly circular swirls or "fish eyes" in the surface of outer layer. This is believed to occur because pockets of caprolactone are formed in the liquid polyethylene-caprolactone mixture. To obtain better mixing of the polyethylene and caprolactone, the temperature must be increased to reduce the viscosity of the high density polyethylene. But when the temperature is increased, the pockets of caprolactone tend to degrade at the higher temperatures. These degraded pockets of caprolactone are believed to be the cause of the unsightly swirls or "fish eyes" in the final product. By thoroughly mixing the ingredients together in their dry state before they are liquified, one is able to avoid this aesthetic problem. This procedure of mixing the ingredients in their dry state also insures more even distribution of the caprolactone in the final product thereby permitting more uniform adhesion of steps and the like to the surface of the outer layer.

Because polycaprolactone does not mix well with polyethylenes, the art teaches away from using polycaprolactone with polyethylenes. However, the fact that the two ingredients do not mix well is actually used as a means of improving the invention: As the trilayers are extruded from the die and through the rollers in the process described above, the rollers are at a temperature of approximately 200° F. The melting temperature of the polymer is approximately 400° F. However, the melting temperature of the polycaprolactone is approximately 150° F. Thus, the caprolactone is still in its liquid phase as it passes through the 200° F. rollers. Since the polycaprolactone does not mix well with polyethylenes, it rises to the surface of the outer layer as the trilayer passes through the rollers. By rising to the surface, the caprolactone is concentrated in the exact location that will most effectively permit interaction of the caprolactone with postage stamps and the like that the user desires to adhere to the envelope. Hence, the characteristic incompatibility of caprolactone with polyethylenes and their difference in melting points is used as a means of improving the invention.

The fact that the caprolactone in its liquid form rises to the surface of the outer layer presents one problem: The caprolactone tends to come off on the rollers as the product passes through the rollers. This creates a buildup of caprolactone on the rollers, which can make it difficult for the tubular trilayer to pass through the rollers as it is flattened by the rollers. It also means that the machine must be stopped for cleaning more often than desired. To overcome this problem, the inventor uses the ingredients that are normally used for the outer layer to form the inner layer and the ingredients that normally go into the inner layer are used to form the outer layer. In this way, the caprolactone is incorporated into the inner layer so that when the tubular trilayer is flattend by the rollers into a sheet, the caprolactone cannot come off onto the rollers because the outer layer that touches the rollers does not have caprolactone in it. The caprolactone that rises to the surface of the inner layer comes off on the opposite surface of the inner layer as the tubular trilayer is flattened as it goes through the rollers. As the sheet exits the rollers, the sheet is cut along its edges so that flattened tubular trilayer can be separated into two sheets. These sheets can be cut and folded so that bags or envelopes can be formed with the inner layer forming the outside surface of the bag or envelope.

One of the difficulties that arises as a result of the difference in melting points of the caprolactone and the polyethylenes is the fact that the structural integrity of the outer layer is compromised when higher percentages of caprolactone are used. This problem is overcome by using lower percentages of caprolactone. In the preferred embodiment, caprolactone is used in proportions of 1-3% by weight with 3% by weight being the ideal. In the preferred range the integrity of the outer layer is maintained while not seriously sacrificing the adhesive characteristics of the surface of the outer layer. The preferred range of caprolactone is also applicable if only a monolayer is employed. Or for that matter, the preferred range is applicable regardless of the number of layers used since the outer layer is the only layer that contains the caprolactone in the preferred embodiment of the invention.

In another method of producing the invention, the die is a flat die. The flat die has an'outer, core, and inner die space as found in the previously described die. The difference is that flat die is substantially flat instead of tubular. Each of the three layers has a separate extruder into which the raw materials for each layer are added. The raw materials are liquified and mixed in the extruders. The extruders are connected to the flat die so that the raw materials for each layer can be pumped into the designated die spaces for each layer just as in the case of the circular die described above. The flat die is kept at a temperature above that of the melting point of the polyethylenes so that the mixtures can flow through the die spaces. The layers are pumped out of the flat die on to a chill roll. The chill roll is an extremely smooth drum that is kept at a temperature substantially below the melting point of the polyethylenes employed. The chill drum rotates as the three layers are poured on to it from the flat die. As the three layers are poured on to the the chill drum, they cool and fuse together. By the time the three layers reach the other side of the drum, they have fused and solidified so that the trilayer formed therefrom falls off the chill drum as a sheet. The continuous sheet coming off the chill drum is treated with the same corona process described above for the tubular trilayer. The trilayer sheet is then wound up in a roll. The material is then used to make bags and envelopes therefrom.

In another embodiment, the core layer is composed of a linear low density polyethylene in proportions of 70-100% by weight. Although, both linear low density or high density polyethylenes can be used. Such linear low density polyethylenes should have a maximum melt flow of 2 decigrams per minute and a density in the range of 0.915 to 0.940 grams per cubic centimeter. The polyethylene used for the core layer can be from any source, including recycled plastic. (In fact, recycled plastic can be used in all the layers.) To the low density polyethylenes, one should thoroughly mix high density white titanium oxide to give the envelope the desired white color. The titanium oxide should be added in proportions of from 0-30% by weight. When the trilayer is formed, the core thermoplastic layer should compose essentially 33-66% of the thickness of said trilayer.

Again, in the preferred embodiment, the inner layer may be composed of a high density or low density polyethylene in proportions of 70-99% by weight. The high or low density polyethylene chosen should have a maximum melt flow of 2 decigrams per minute and a preferred density in the range of 0.915 to 0.970 grams per cubic centimeter. A high density polyethylene is preferred of 0.940 to 0.970 grams per cubic centimeter if one desires to prevent the flap of the envelope from curling. The flap does not curl when the envelope is sealed, but the flap does curl when not in use if low density polyethylenes are used to make the inner layer. It is also important not to add lamellar filler to the inner layer because the edges of the envelope will not fuse when the trilayer sheet is folded over to make the envelope if there is lamellar filler in the inner layer. When the trilayer is formed, the inner thermoplastic layer should compose essentially 10-33% of the thickness of said trilayer thermoplastic.

While the applicant has discussed the invention in its monolayer and trilayer embodiments, is is also true that the invention will work with a plurality of layers.

The invention and its attendant advantages will be understood from the foregoing description and it will be apparent that various changes may be made without departing from the spirit and scope thereof or sacrificing its material advantages.

I claim:

1. A process for making a synthetic, voidless, thermoplastic film, said film being a trilayer film and having a thickness of from 60 microns to 250 microns and one of said trilayers is an outer layer that includes an outer surface, said process comprising the following steps:

formulating said outer layer composed of 70-100% by weight of linear high density polyethylene having a maximum melt flow of up to 2 decigrams per minute and a density in the range of 0.940 to 0.970 grams per cubic centimeter;

formulating a core layer composed of 70-100% weight of a linear high density polyethylene having a maximum melt flow of up to 2 decigrams per minute and a density in the range of 0.940 to 0.970 grams per cubic centimeter;

formulating an inner layer composed of 70-99% by weight of a linear high density polyethylene having a maximum melt flow of up to 2 decigrams per minute and a density in the range of 0.940 to 0.970 grams per cubic centimeter, and 1-29% by weight of polycaprolactone;

forming said outer layer by liquefying said linear high density polyethylene, then extruding the resulting mixture through a die and rollers to form a flat sheet;

forming said core layer by liquefying said linear high density polyethylene, then extruding the resulting mixture through another die and rollers to form a flat sheet;

forming said inner layer by liquefying and mixing said polyethylene and caprolactone together, then extruding the resulting mixture through a die and rollers that extract said mixture from said die to form a flat sheet whereby said caprolactone as it passes said rollers rises toward said outer surface to allow adherence of a glue backed member thereto;

forming said trilayer film by fusing said inner, core and outer flat sheets together as each said sheet is extruded from said dies and rollers; and cooling said trilayer sheets.

2. The process of claim 1 in which linear low density polyethylene having a maximum melt flow of up to 2 decigrams per minute and a density in the range of 0.915 to 0.940 grams per cubic centimeter is substituted for said linear high density polyethylene of said core layer.

3. The process of claim 2 in which low density polyethylene having a maximum melt flow of up to 2 decigrams per minute and a density in the range of 0.915 to 0.940 grams per cubic centimeter is substituted for said high density polyethylene of said inner layer.

4. The process of claim 1 in which low density polyethylene having a maxim melt flow of up to 2 decigrams per minute and a density in the range of 0.915 to 0.940 grams per cubic centimeter is substituted for said high density polyethylene of said inner layer.

5. A process as defined in claim 1 wherein said inner, core and outer dies are circular thereby:
emitting sexless inner, core and outer tubings forming a final product which is tubular.

6. A process as defined in claim 1 wherein said inner, core and outer dies are flat thereby:
emitting flat inner, core and outer sheets forming a final product which is a flat sheet.

7. A process as defined in claim 1 wherein there is the added step of:
adding white titanium oxide in an amount up to 30% by weight to said inner layer to give said layer whiteness.

8. A process as defined in claim 7 further comprising an additional step of:
cutting said cooled film sheet into a desired shape; and forming an enclosure member from said shape wherein said white outer surface forms the exterior surface thereof.

9. In a synthetic thermoplastic monolayer film having two surfaces said film having been extruded through a die wherein said film is composed of a polyethylene having a maximum melt flow of up to 2 decigram per minute and a density in the range of 0.915 to 0.970 grains per cubic centimeter and inorganic lamellar filler particles in proportions of 1-29% by weight wherein the largest particles have a minimum particle diameter to particle thickness ratio of about 5:1 and wherein said film has a thickness of from 20 microns to 250 microns, the improvement comprising:
polycaprolactone intermixed with said polyethylene and said inorganic lamellar filler in proportions of 1-29% by weight of the mixture, said polycaprolactone being concentrated on at least one surface of said film to allow adherence of a glue backed member thereto.

10. In a synthetic thermoplastic film of claim 9 wherein:
said polycaprolactone is used in proportions of 1-3% by weight.

11. In a synthetic thermoplastic film of claim 10 wherein:
said polycaprolactone used is 3% by weight.

12. The synthetic thermoplastic film of claim 9 wherein:
said film is extruded through a flat die in a sheet form and a container is formed of said sheet material wherein said surface with said concentration of polycaprolactone forms the outside of said container.

13. The synthetic thermoplastic film of claim 9 wherein:
said film is extruded through a circular tubular die in the form of a seamless tubing.

14. A process for making a synthetic thermoplastic monolayer film having two surfaces comprising the following steps:
selecting a drypolyethylene having a maximum melt flow of 2 decigrams per minute and a density in the range of 0.915 to 0.970 gra/as per cubic centimeter;
selecting a dry polycaprolactone;
mixing said polyethylene and said polycaprolactone in said dry state to form a mix comprising 70-99% by weight of dry polyethylene and 1-29% by weight of dry polycaprolactone;
liquefying and extruding said liquified mix through a die having rollers;
heating said rollers to a temperature of approximately 200°;
passing said mix over said rollers wherein said polycaprolactone rises toward at least one of said two surfaces to allow adherence of a glue backed member when said film is cooled as it passes from said die as a sheet.

15. A process of claim 14 further comprising an additional step including:
adding and mixing inorganic lamellar filler particles, the largest dimension of which being less than 150 microns and said particles having a minimum particle diameter to particle thickness ratio of about 5:1 to said liquified mix before passing said mixture through said die.

16. A process of claim 15 including the additional step of:
adding white titanium oxide in an amount up to 30% by weight to said mixture to give said film whiteness.

17. A process of claim 11 wherein there is an additional step of:
cutting said cooled film sheet into a desired shape; and
forming an enclosure member from said shape wherein said at least one surface forms the exterior surface thereof.

18. In a synthetic thermoplastic trilayer film including an outer layer, a core layer and an inner layer which is extruded through a die wherein said outer layer has an outer surface and wherein said outer layer is composed of essentially 70-99% by weight of a linear high density polyethylene and inner and core layers are all composed of essentially 70-100% by weight of polyethylene having a maximum melt flow of up to 2 decigram per minute and a density in the range of 0.940 to 0.970 grains per cubic centimeter in the case of the outer layer and 0.915 to 0.970 grams per cubic centimeter in the case of said inner and core layers, said trilayer film having a 40 microns to 250 microns thickness, the improvement comprising:
said outer layer including 1-29% by weight of polycaprolactone to form a concentration on said outer surface of said film to allow adherence of a glue backed member thereto;
said outer layer with said polycaprolactone and said inner layer are each composed essentially of a 10-33% thickness of said total trilayer film, and
said core layer is composed essentially of a 33-66% thickness of said trilayer film.

19. In a synthetic thermoplastic trilayer film of claim 18 wherein:
said polycaprolactone is in proportion of 1-3% by weight.

20. In a synthetic thermoplastic trilayer film of claim 19 wherein:
said polycaprolactone is 3% by weight.

21. The a synthetic thermoplastic trilayer film of claim 18 wherein:
said film is extruded through a flat die in a sheet form and a container is formed of said sheet material wherein said outer layer forms the outside of said container.

22. In a synthetic thermoplastic trilayer film of claim 18 wherein:
said outer surface includes white titanium oxide in an amount of 30% by weight of said surface to give said container whiteness.

23. In a synthetic thermoplastic trilayer film of claim 18 wherein:
said layers of film are extruded and bonded together through a circular tubular die in the form of seamless tubing.

24. An envelope formed from a synthetic thermoplastic film sheet the material of which is extruded through a die wherein said envelope has an outer surface to receive and hold a glue backed member and the film of said envelope comprises:

a polyethylene having a maximum melt flow of up to 2 decigrams per minute and a density in the range of 0.915 to 0.970 grams per cubic centimeter;
inorganic lamellar filler particles in proportions of 1–29% by weight wherein the largest particles have minimum particles diameter to particles thickness ratio of about 5:1;
polycaprolactone intermixed with said polyethylene and said inorganic lamellar filler in proportions of 1–29% by weight to form a concentration on said outer surface of said envelope to allow adherence of said glue backed member thereto.

25. An envelope as defined in claim 24 wherein:
said film includes white titanium oxide in an amount up to 30% by weight of said inner layer to give said envelope whiteness.

* * * * *